US010760445B2

(12) United States Patent
Warren et al.

(10) Patent No.: US 10,760,445 B2
(45) Date of Patent: Sep. 1, 2020

(54) ELECTRICAL RESISTANCE WEAR INDICATOR

(71) Applicant: United Technologies Corporation, Farmington, CT (US)

(72) Inventors: Eli Cole Warren, Wethersfield, CT (US); Corey A. Benoit, Uncasville, CT (US); Ian F. Agoos, Boston, MA (US); Edward F. Dreger, III, Burlington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 149 days.

(21) Appl. No.: 15/667,834

(22) Filed: Aug. 3, 2017

(65) Prior Publication Data
US 2019/0040759 A1     Feb. 7, 2019

(51) Int. Cl.
| | | |
|---|---|---|
| *G01R 27/08* | (2006.01) |
| *F01D 21/00* | (2006.01) |
| *G01B 21/16* | (2006.01) |
| *G01M 15/14* | (2006.01) |
| *F01D 11/08* | (2006.01) |

(Continued)

(52) U.S. Cl.
CPC .......... *F01D 21/003* (2013.01); *F01D 11/08* (2013.01); *G01B 7/14* (2013.01); *G01B 21/16* (2013.01); *G01M 15/14* (2013.01); *G01N 27/20* (2013.01); *F01D 11/122* (2013.01); *F01D 21/04* (2013.01); *F05D 2220/323* (2013.01);

(Continued)

(58) Field of Classification Search
CPC . G01B 5/14; G01B 7/14; G01B 11/14; G01B 21/16; G01N 27/20; G01N 3/56; F05D 2260/80; F05D 2260/83; F05D 2220/323; F05D 2240/55; F05D 2240/11; F01D 11/08; F01D 11/22; F01D 11/122
See application file for complete search history.

(56) References Cited

U.S. PATENT DOCUMENTS 6,390,669 B1 * 5/2002 Nakamura ......... G01N 25/4866
374/10
6,717,420 B2    4/2004 Eyraud et al.
(Continued)

FOREIGN PATENT DOCUMENTS

EP     3018445 A1    5/2016
GB     2449709 A    12/2008

OTHER PUBLICATIONS

The Extended European Search Report for Application No. 18187281. 3-1001; Report Issued Date: Jan. 7, 2019; 11 pages.

*Primary Examiner* — Thang X Le
(74) *Attorney, Agent, or Firm* — Cantor Colburn LLP

(57) ABSTRACT

In combination a wear indicator and a component of a gas turbine engine is provided. The wear indicator is secured to a surface of the component of the gas turbine engine. The wear indicator comprising: a first component including: a first plate; a second plate opposite the first plate; a plurality of wires extending from first plate to the second plate, wherein the first plate is electrically connected to the second plate through the plurality of wires; and a potting material configured to partially fill the first component and fill voids between the plurality of wires, such that the plurality of wires are electrically insulated from each other by the potting material.

9 Claims, 7 Drawing Sheets

(51) Int. Cl.
  *G01B 7/14*   (2006.01)
  *G01N 27/20*   (2006.01)
  *F01D 11/12*   (2006.01)
  *F01D 21/04*   (2006.01)

(52) U.S. Cl.
  CPC ...... *F05D 2240/55* (2013.01); *F05D 2260/80* (2013.01); *F05D 2260/83* (2013.01); *F05D 2270/80* (2013.01)

(56) References Cited

U.S. PATENT DOCUMENTS

| | | | |
|---|---|---|---|
| 7,060,177 B2* | 6/2006 | Law | G01N 17/02 |
| | | | 204/404 |
| 7,688,081 B2 | 3/2010 | Webster | |
| 8,684,669 B2 | 4/2014 | Chehab et al. | |
| 2003/0122682 A1* | 7/2003 | Gass | C23C 4/12 |
| | | | 340/679 |
| 2005/0158511 A1 | 7/2005 | Sabol et al. | |
| 2007/0180897 A1* | 8/2007 | Dankert | F01D 21/003 |
| | | | 73/112.01 |
| 2008/0054645 A1* | 3/2008 | Kulkarni | F01D 15/10 |
| | | | 290/52 |
| 2010/0242293 A1 | 9/2010 | Willett et al. | |
| 2011/0027063 A1* | 2/2011 | Hefner | G01N 17/02 |
| | | | 415/1 |
| 2014/0102199 A1* | 4/2014 | Kratzsch | F03B 11/008 |
| | | | 73/579 |
| 2016/0273451 A1* | 9/2016 | Kling | B64C 11/14 |
| 2017/0159446 A1* | 6/2017 | Graham | F01D 5/147 |
| 2017/0293517 A1* | 10/2017 | Dion | G06F 11/0721 |
| 2019/0204256 A1* | 7/2019 | Humphries | F16L 57/06 |

* cited by examiner

ELECTRICAL RESISTANCE WEAR INDICATOR

BACKGROUND

The subject matter disclosed herein generally relates to measurement devices and, more particularly, to a method and an apparatus for detecting blade tip clearance for a gas turbine engine.

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

The compressor and turbine sections include multiple rotors and stators configured to enable optimal operation. Gas turbine engines maintain an optimal clearance (distance) between the tips of the rotors and an outside diameter of a gas path within the turbine engine, and thereby provide the conditions necessary to achieve a desired performance.

SUMMARY

According to one embodiment, in combination a wear indicator and a component of a gas turbine engine is provided. The wear indicator is secured to a surface of the component of the gas turbine engine. The wear indicator comprising: a first component including: a first plate; a second plate opposite the first plate; a plurality of wires extending from first plate to the second plate, wherein the first plate is electrically connected to the second plate through the plurality of wires; and a potting material configured to partially fill the first component and fill voids between the plurality of wires, such that the plurality of wires are electrically insulated from each other by the potting material.

In addition to one or more of the features described above, or as an alternative, further embodiments may include that the first component is configured to delaminate when impacted by a blade of the gas turbine engine.

In addition to one or more of the features described above, or as an alternative, further embodiments may include a second component of the wear indicator having a blind hole partially enclosing the first component, wherein the wear indicator is secured to a surface of the component of the gas turbine engine through the second component.

In addition to one or more of the features described above, or as an alternative, further embodiments may include that the component is a blade outer air seal.

In addition to one or more of the features described above, or as an alternative, further embodiments may include a measurement device electrically connected to the first plate through a first lead line and electrically connected to the second plate through second lead line, wherein the measurement device is configured to determine the resistance of at least one of the first plate, the second plate, and the plurality of wires.

In addition to one or more of the features described above, or as an alternative, further embodiments may include that the second component further comprises: a first side that delaminates when impacted by a blade of the gas turbine engine; a second side parallel to the first side, the second side being secured to the component of the gas turbine engine; and a mid-section interposed between the first side and the second side; wherein the mid-section is conical frustum in shape.

In addition to one or more of the features described above, or as an alternative, further embodiments may include that the first component has a cylindrical shape.

In addition to one or more of the features described above, or as an alternative, further embodiments may include that the first plate and the second plate compose a substantial portion of a curved surface of the cylindrical shape, wherein the first plate and the second plate are separated by a gap in the curved surface.

In addition to one or more of the features described above, or as an alternative, further embodiments may include that the first plate further includes a plurality of first orifices and the second plate further includes a plurality of second orifices, and wherein each of the plurality of wires extends from a first orifice to a second orifices.

According to another embodiment, in combination a wear indicator and a component of a gas turbine engine is provided. The wear indicator is secured to a surface of the component of the gas turbine engine. The wear indicator comprising: a first component including: a post; and a ribbon wire having a first end and a second end opposite the first end, wherein the first end is operably connected to the post, and wherein the ribbon wire is wrapped around the post.

In addition to one or more of the features described above, or as an alternative, further embodiments may include that the first component is configured to delaminate when impacted by a blade of the gas turbine engine.

In addition to one or more of the features described above, or as an alternative, further embodiments may include: a second component of the wear indicator having a blind hole partially enclosing the first component, wherein the wear indicator is secured to a surface of the component of the gas turbine engine through the second component.

In addition to one or more of the features described above, or as an alternative, further embodiments may include that the component is a blade outer air seal.

In addition to one or more of the features described above, or as an alternative, further embodiments may include a measurement device electrically connected to the first end through a first lead line and electrically connected to the second end through second lead line, wherein the measurement device is configured to determine the resistance of the ribbon wire.

In addition to one or more of the features described above, or as an alternative, further embodiments may include that the second component further comprises: a first side that delaminates when impacted by a blade of the gas turbine engine; a second side parallel to the first side, the second side being secured to the component of the gas turbine engine; and a mid-section interposed between the first side and the second side; wherein the mid-section is conical frustum in shape.

In addition to one or more of the features described above, or as an alternative, further embodiments may include that the post is cylindrical in shape.

In addition to one or more of the features described above, or as an alternative, further embodiments may include that the ribbon wire is wrapped around an outer surface of the post.

In addition to one or more of the features described above, or as an alternative, further embodiments may include that the ribbon wire is wrapped around an inner surface of the post.

According to another embodiment, a method of detecting blade clearance in a gas turbine engine is provided. The method comprising: attaching a wear indicator to an inner surface of a gas turbine engine opposite a blade of the gas turbine engine; measuring a first resistance of the wear indicator; operating the gas turbine engine at a first selected speed for a first period of time to remove material from the wear indicator; measuring a second resistance of the wear indicator after material is removed from the wear indicator; determining a change in resistance between the second resistance and the first resistance; and determining an amount of material removed from the wear indicator by the blade in response to the change in resistance.

In addition to one or more of the features described above, or as an alternative, further embodiments may include determining a clearance between the blade and the inner surface in response to the amount of material removed from the wear indicator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
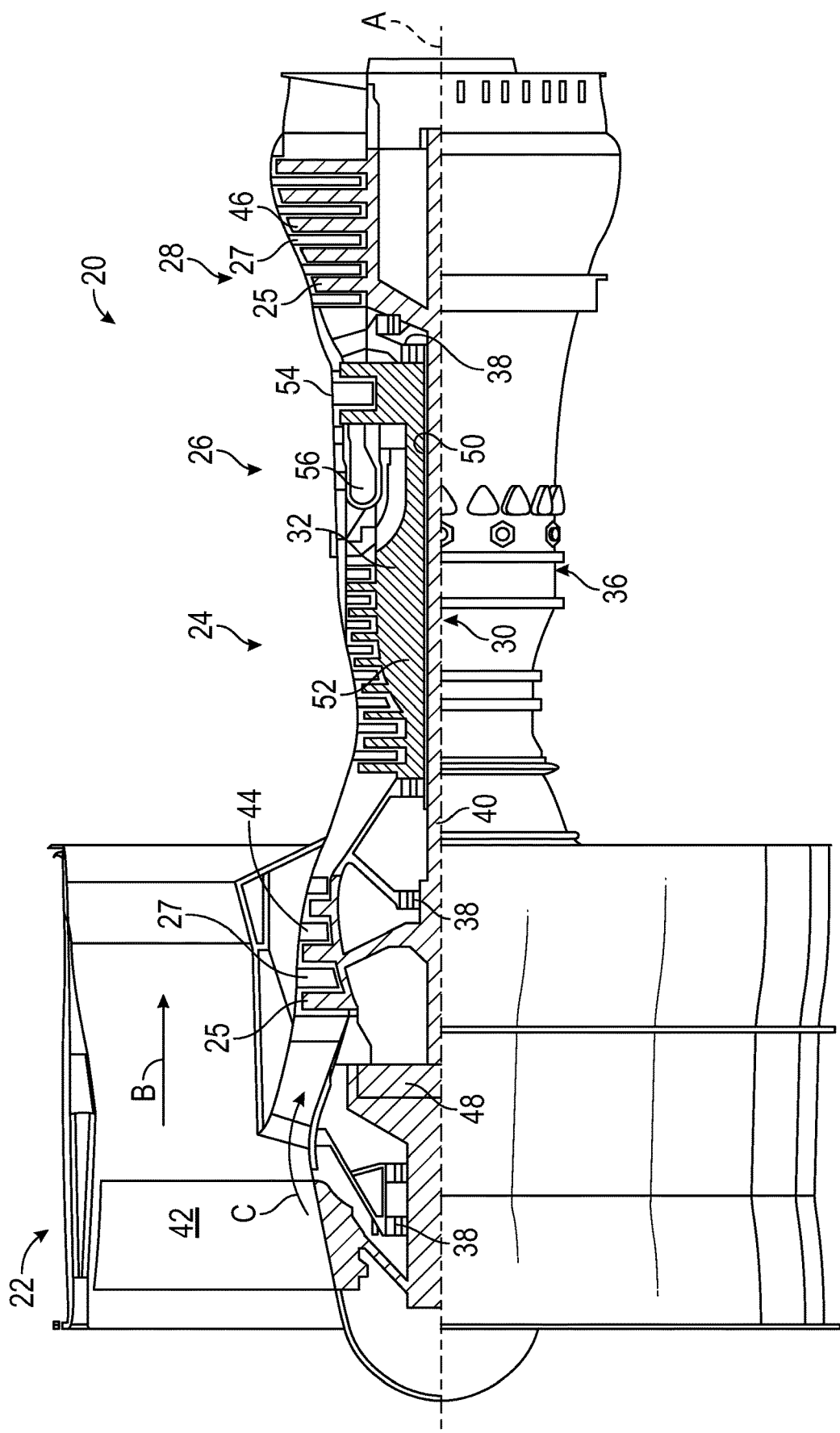
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
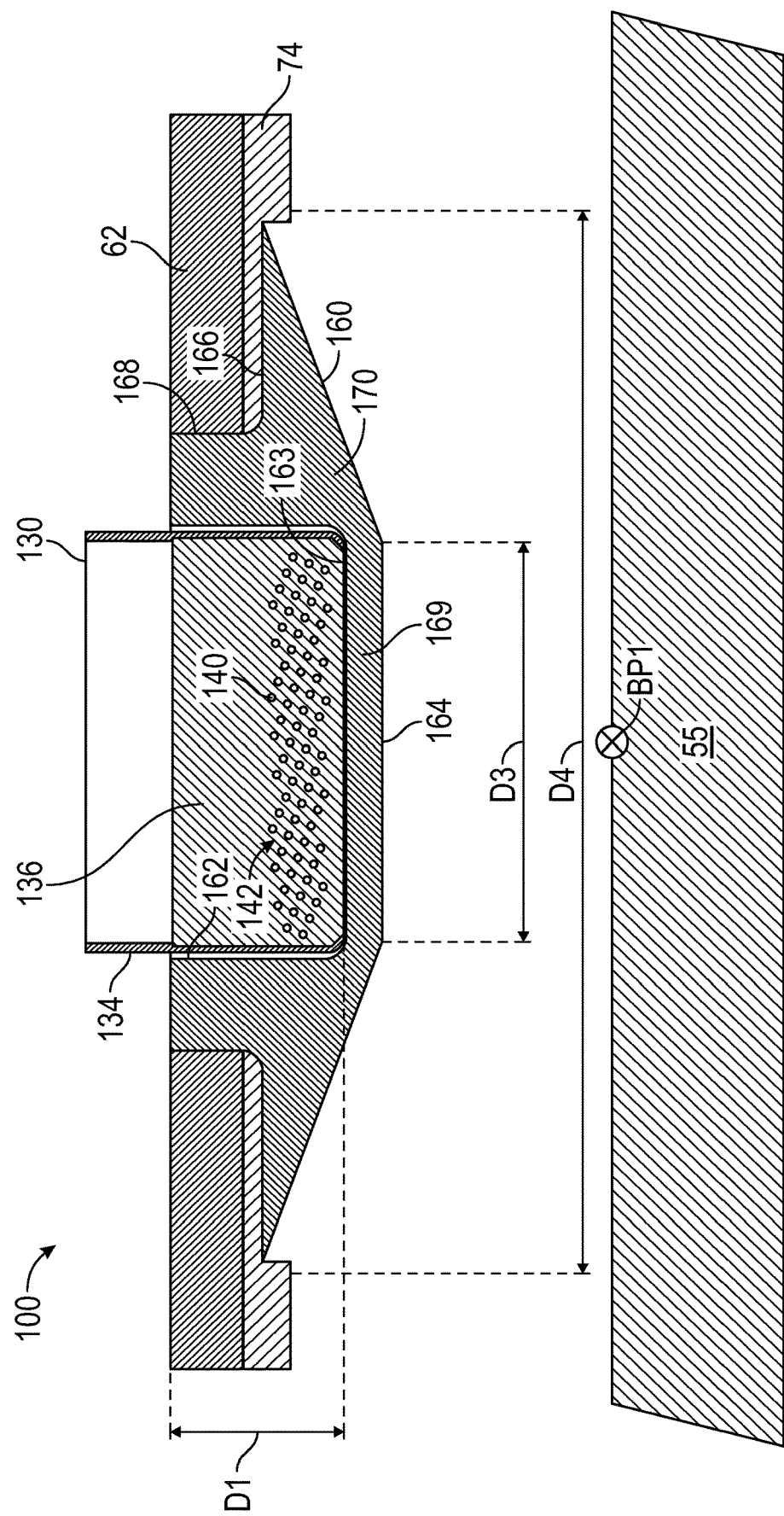
FIG. 2 is a cross-sectional illustration of the wear indicator, in accordance with an embodiment of the disclosure.

Referring now to FIG. 2, which shows a cross-sectional view of a rub button or wear indicator 100 installed in a gas turbine engine 20, in accordance with an embodiment of the disclosure. As seen in FIG. 2, the wear indicator 100 is attached to an inner surface 72 of the gas turbine engine 20 opposite a blade 55 of the gas turbine engine 20. The blade 55 rotates along a blade path BP1. In the illustrated embodiment, the wear indicator 100 is attached to a blade outer air seal 62, the outer air seal 62 is the inner surface 72. One or more wear indicators 100 may be affixed to the inner surface 72 of the gas turbine engine 20 in order to monitor the clearance between the blade 55 and the inner surface 72, a method discussed further below in FIG. 7. In the embodiment of FIG. 2, the wear indicator 100 has been installed in the high pressure turbine 54 of the gas turbine engine 20. It is understood that the wear indicator 100 may be located in other sections of the gas turbine engine 20 having rotating blades 55. An abradable coating 74 may be applied on the inner surface 72 of the gas turbine engine 20 and the wear indicator 100 may be covered by the abradable coating 74 on the inner surface 72. The abradable coating 74 is designed to provide protection for the inner surface 72 against a blade 55 strike. If a blade 55 were to extend towards the inner surface 72 then the abradable coating 74 shall be struck first and absorb the impact of the blade 55 to prevent damage to the inner surface 72. The wear indicator 100 may be attached to the inner surface 72 using an adhesive (not shown) that may or may not need a curing to adhere the wear indicator 100 to the inner surface 72.

Figure 3:
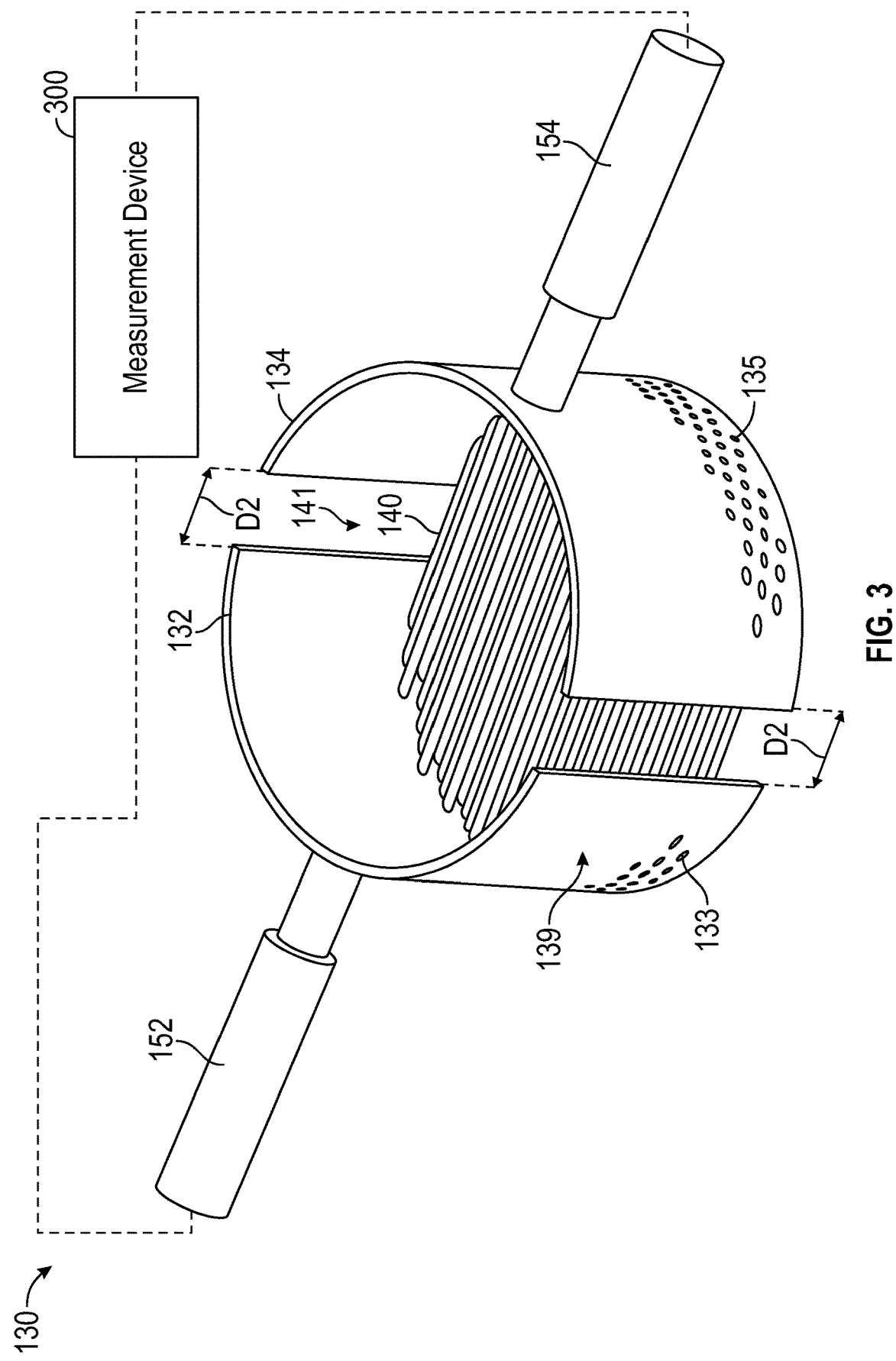
FIG. 3 is a perspective of a first component of the wear indicator of FIGS. 2 and 3, in accordance with an embodiment of the disclosure.

As seen in FIG. 2, the wear indicator 100 may comprise a first component 130 and a second component 160 configured to partially enclose the first component 130. The first component includes a plurality of wires 140 extending from a first plate 132 to a second plate 134, as seen in FIG. 3. The first plate 132 includes a plurality of first orifices 133 and the second plate 134 includes a plurality of second orifices 135. The plurality of second orifices 135 are complimentary to the plurality of first orifices 133. Each wire 140 extends from a first orifice 133 to a second orifice 135. The plurality of wires 140 extend across a cavity 141 between the first plate 132 and the second plate 134. The first component 130 may be partially filled with a potting material 136. The potting material 136 is configured to fill voids 142 between each of the plurality of wires 140, such that the plurality of wires 140 are electrically insulated from each other by the potting material 136. The potting material 136 is non-conductive and capable of withstanding the high temperatures of a gas turbine engine. The potting material 136 may only partially fill the cavity 141 a portion D1. The first component 130 may have a round shape and/or a cylindrical shape, as seen in FIG. 3. It is understood that the round and/or cylindrical shape of the first component 130 show in FIG. 3 is not intended to be limiting and the first component 130 may have a variety of different shapes. The first plate 132 and the second plate 134 compose a substantial portion of a curved surface 139 of the cylindrical shape of the first component 130. It is also understood that the curved shape of the plates 132, 134 show in FIG. 3 is not intended to be limiting and the plates 132, 134 may have a variety of different shapes. The first plate 132 and the second plate 134 are separated by the gap D2 in the curved surface 139. Advantageously, the gap D2 keeps the first plate 132 electrically separate from the second plate 134.

The first plate 132 may be connected to a first lead line 152 and the second plate 134 may be connected to a second lead line 154. The lead lines 152, 154 may be connected to a measurement device 300 configured to measure the resistance through the plates 132, 134 and plurality of wires 140. The measurement device 300 may include a processor and a memory. For ease of illustration, the processor and memory are not shown in FIG. 3. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware.

Each of the plates 132, 134 have a known resistance and each of the plurality of wires 140 have a known resistance. Advantageously, since the plurality of wires 140 and the plates 132, 134 each have a known resistance then as the blade 55 cuts into the wear indicator 100 removing some of the plurality of wires 140 then the depth that the blade 55 cut into the wear indicator 100 may be determined by measuring the resistance after the cut and comparing to the original resistance prior to the cut.

The second component 160 includes a blind hole 162 configured to partially enclose the first component 130. The blind hole 162 includes a blind hole base 163. The first component 130 is inserted into the blind hole 162 such that the second component 160 partially encloses the first component 130 and the plurality of wires 140 are located proximate the base 163 of the blind hole 162. In an embodiment, the blind hole 162 substantially matches a shape of the first component 130. In an embodiment, the blind hole 162 may be a round shape and/or a cylindrical shape. The first component 130 may be securely attached to the second component 160 by an epoxy capable of withstanding the high temperatures of a gas turbine engine 20. The second component 160 may be composed of a ceramic material capable of withstanding the high temperatures of a gas turbine engine 20.

The second component 160 may have a first side 164 and a second side 166 parallel to the first side 164. The first side 164 shares a common wall 169 with the blind hole base 163. The second component 160 also comprises a mid-section 170 interposed between the first side 164 and the second side 166. In an embodiment, a second diameter D4 of the second side 166 may be larger than a first diameter D3 of the first side 164. The second side 166 may be affixed to the blade outer air seal 62 and/or the abradable coating 74. The second side 166 may be affixed to the blade outer air seal 62 and/or the abradable coating 74 by an epoxy in a non-limiting example. If the blade 55 strikes the second component 160 then a layer of the second component 160 will be removed from the first side 164. Thus, the first side 164 delaminates when impacted by a blade 55 of the gas turbine engine 20. Delaminate may be understood to mean the removal of material from the second component 160 in layers. In an embodiment, the first component 130 is configured to delaminate when impacted by a blade 55 of the gas turbine engine 20. The second component 160 will continue to delaminate in layers until the first component 130 is exposed to the blade 55 and then the first component 130 and the second component 160 will delaminate together. In an embodiment, the mid-section 170 of the second component 160 between the first side 164 and the second side 166 may have conical frustum shape, as seen in FIG. 2. Advantageously, since the mid-section 170 is within the flow path of the gas turbine engine 20, a conical frustum shape is aerodynamic and may provide reduce disturbance to airflow through the gas turbine engine 20. Also advantageously, a conical frustrum shape may minimize major material loss when struck by the blade 55. As may be appreciated by one of skill in the art, the second component 160 may include various shapes, sizes and reference dimensions not disclosed herein.

The second component 160 may also include an extrusion 168 projecting out from the second side 166. The extrusion 168 may provide additional support to the first component 130. The extrusion 168 may protrude into the blade outer air seal 62. A portion of the first component 130 may protrude past the blade outer air seal 62, such that the plates 132, 134 may be connected to the lead lines 152, 154 without interfering with the blade outer air seal 62.

Referring now to FIGS. 4a-4g with continued reference to FIGS. 1-3. FIGS. 4a-4g shows a flow chart illustrating a method 400 for manufacturing a wear indicator 100 in accordance with an embodiment of the present disclosure. Blocks 404, 506, and 508 illustrate the fabrication/assembly of a first component 130 of the wear indicator 100. At block 404, a first plate 132 is formed having a plurality of first orifices 133. Also at block 404, a second plate 134 is formed having a plurality of second orifices 135. Further at block 404, the second plate 134 is oriented in relation to the first plate 132 such that the plurality of second orifices 135 are complimentary to the plurality of first orifices 133, as seen in FIG. 4. The term complimentary means that the orifices 135, 133 are generally in line with each other.

At block 406 a plurality of wires 140 are welded to the first plate 132. Each of the wires 140 is located in a first hole 133 of the first plate 132. Also at block 406, each of the plurality of wires 140 extend across a cavity 141 between the first plate 132 and the second plate 134. Further at block 406, the plurality of wires 140 are welded to the second plate 134. Each of the wires 140 is located in a second hole 135 of the second plate 134.

At block 408, a portion D1 of the cavity 141 is filled with a potting material 136 such that the potting material 136 fills voids 142 between each of the plurality of wires 140. The potting material 136 may enter the cavity as a liquid flowing in between the wires 140 and then harden to a solid. The plurality of wires 140 are electrically insulated from each other by the potting material 136.

At block 410, a second component 160 having a blind hole 162 with a blind hole base 163 is obtained. Also at block 410, the first component 130 is inserted into the blind hole 162 such that the second component 160 partially encloses the first component 130 and the plurality of wires 140 are located proximate the base 163 of the blind hole 162. Block 410 may also include forming the second component 160. As mentioned above, a formed second component 160 may include a first side 164 that delaminates when impacted by a blade 55 of the gas turbine engine 20; and a second side 166 parallel to the first side 164. The first side 164 shares a common wall 169 with the blind hole base 163. Block 410 may also include attaching the first component 130 to the second component 160. The first component 130 may be attached to the second component 160 using an epoxy.

At block 412, the second side 166 is attached to a blade outer air seal 62. At block 414, first lead line 152 is electrically connected to the first plate 132 and a second lead line 154 is electrically connected to the second plate 134. At block 416, a portion of the first side 164 of the second component 160 is removed after the first component 130 has been inserted into the second component 160. The portion may be removed by grinding the first side 164. Advantageously, a portion of the first side 164 may be grinded away in order to achieve a desired starting size for the wear indicator 100.

While the above description has described the flow process of FIGS. 4a-4g in a particular order, it should be appreciated that unless otherwise specifically required in the attached claims that the ordering of the steps may be varied.

Figure 5:
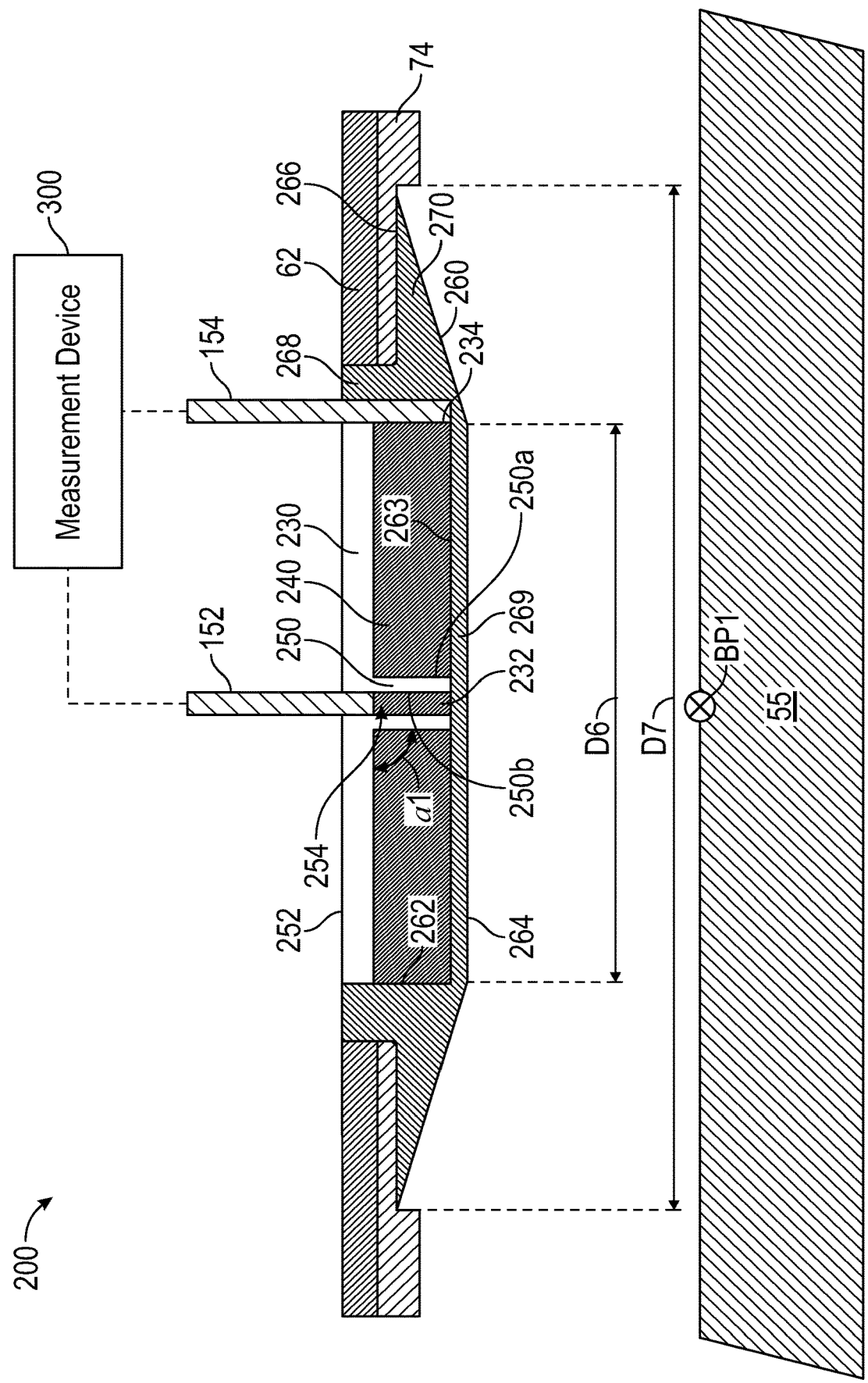
FIG. 5 is a cross-sectional illustration of the wear indicator, in accordance with an embodiment of the disclosure.

Referring now to FIG. 5, which shows a cross-sectional view of a rub button or wear indicator 200 installed in a gas turbine engine 20, in accordance with an embodiment of the disclosure. As seen in FIG. 5, the wear indicator 200 is attached to an inner surface 72 of the gas turbine engine 20 opposite a blade 55 of the gas turbine engine 20. The blade 55 rotates along a blade path BP1. In the illustrated embodiment, the wear indicator 200 is attached to a blade outer air seal 62, the outer air seal 62 is the inner surface 72. One or more wear indicators 200 may be affixed to the inner surface 72 of the gas turbine engine 20 in order to monitor the clearance between the blade 55 and the inner surface 72, a method discussed further below in FIG. 7. In the embodiment of FIG. 5, the wear indicator 200 has been installed in the high pressure turbine 54 of the gas turbine engine 20. It is understood that the wear indicator 200 may be located in other sections of the gas turbine engine 20 having rotating blades 55. An abradable coating 74 may be applied on the inner surface 72 of the gas turbine engine 20 and the wear indicator 200 may be covered by the abradable coating 74 on the inner surface 72. The abradable coating 74 is designed to provide protection for the inner surface 72 against a blade 55 strike. If a blade 55 were to extend towards the inner surface 72 then the abradable coating 74 shall be struck first and absorb the impact of the blade 55 to prevent damage to the inner surface 72. The wear indicator 200 may be attached to the inner surface 72 using an adhesive (not shown) that may or may not need a curing to adhere the wear indicator 200 to the inner surface 72.

Figure 4:
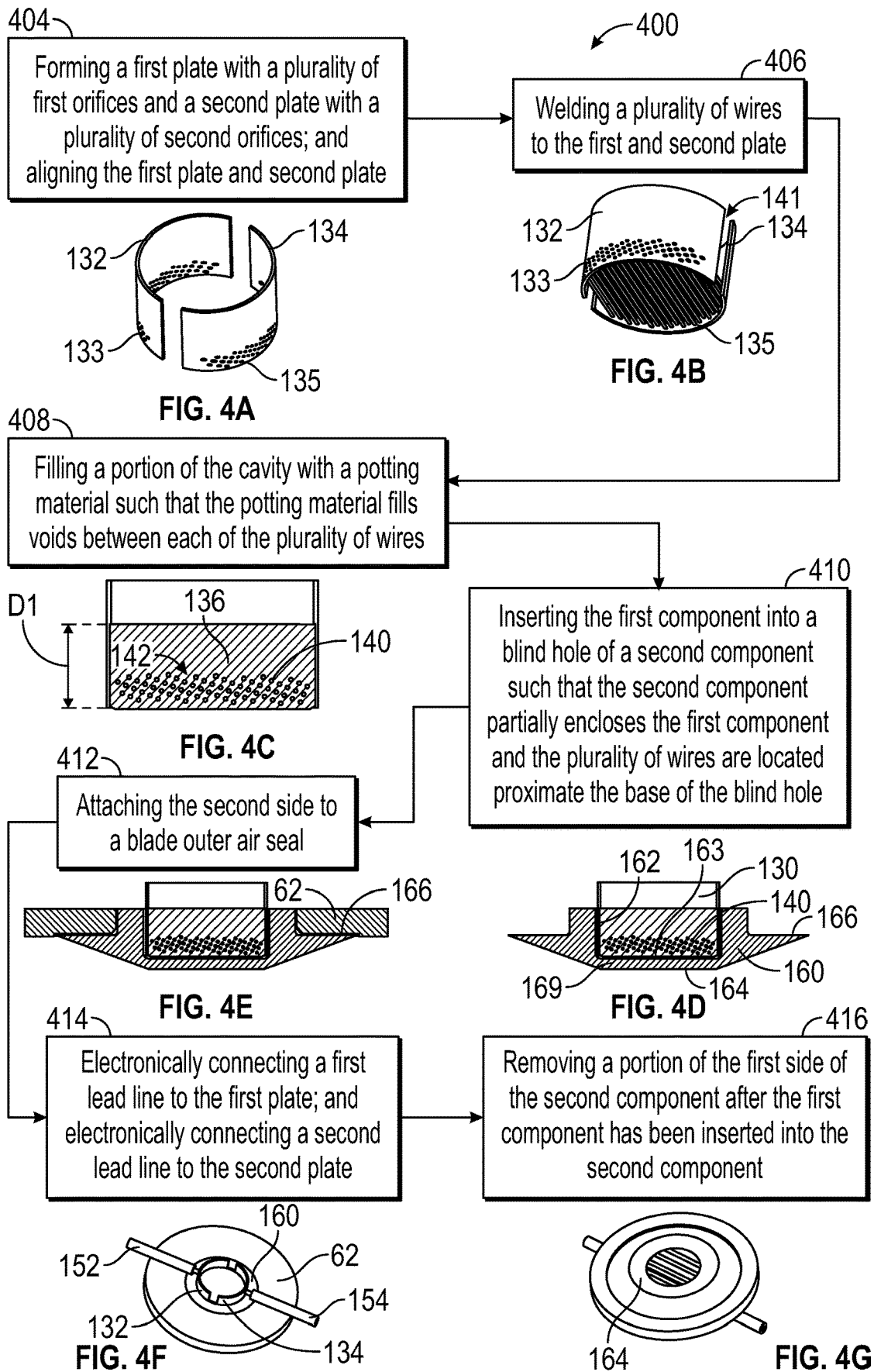
FIG. 4a-4g is a flow chart illustrating a method of manufacturing the wear indicator of FIGS. 2-3, in accordance with an embodiment of the disclosure.

FIG. 5 shows an alternate embodiment of a wear indicator 200 as opposed to the wear indicator that was shown in FIGS. 2-4. As seen in FIG. 5, the wear indicator 200 may comprise a first component 230 and a second component 260 configured to partially enclose the first component 230. The first component 230 may include a post 250 and a ribbon wire 240. As seen in FIG. 5, the ribbon wire 240 has a first end 232 and a second end 234 opposite the first end.

The first end 232 is operably connected to the post 250 and the ribbon wire 240 is wrapped around the post 250. Once wrapped around the post 250, the ribbon wire 240 forms a coiled resistive element having a known resistance. The ribbon wire 240 may include an insulating material configured to insulate portions of the ribbon wire 240 from other portions of the ribbon wire 240 when wrapped in a coiled resistive element, such that the ribbon wire 240 is electrically insulated from itself. In two non-limiting examples, the insulating material may be an insulating material on one side of the ribbon wire 240 and/or a solidifying insulating liquid that fills the gaps between the ribbon wire 240 when coiled. In an embodiment, the post 250 is cylindrical in shape. As seen in FIG. 5, the first end 232 is radially inward from the second end 234 once wrapped, however other wrapping arrangements may also be used, such as, for example, the post 250 may include a larger orifice 254 and the ribbon wire 240 may be wrapped around the inside of the post 250 within the orifice 254, thus wrapping from a radially outward position to a radially inward position. In the illustrated embodiment, the ribbon wire 240 is wrapped around an outer surface 250a of the post 250. In an alternative embodiment, the ribbon wire 240 may be wrapped around the inner surface 250b of the post 250. The post 250 may be operably connected to a base 252. The base 252 may be oriented at a first angle α1 relative to the post 250. The first angle α1 may be equal to about 90°, thus the base 252 may be about perpendicular to the post 250. The base 252 may be circular in shape. In an embodiment, the post 250 and the base 252 may be composed of non-conductive material.

The first end 232 may be connected to a first lead line 152 and the second end 234 may be connected to a second lead line 154. The lead lines 152, 154 may be connected to a measurement device 300 configured to measure the resistance through the ribbon wire 240. The measurement device 300 may include a processor and a memory. For ease of illustration, the processor and memory are not shown in FIG. 5. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware.

The ribbon wire 240 has a known resistance, as mentioned above. Advantageously, since the ribbon wire 240 has a known resistance, as the blade 55 cuts into the wear indicator 200 removing a portion of the ribbon wire 240 then the depth that the blade 55 cut into the wear indicator 200 may be determined by measuring the resistance after the cut and comparing to the original resistance prior to the cut.

The second component 260 includes a blind hole 262 configured to partially enclose the first component 230. The blind hole 262 includes a blind hole base 263. The first component 230 is inserted into the blind hole 262 such that the second component 260 partially encloses the first component 230 and the ribbon wire 240 is located proximate the base 263 of the blind hole 262. In an embodiment, the blind hole 262 substantially matches a shape of the first component 230. In an embodiment, the blind hole 262 may be a round shape and/or a cylindrical shape. The first component 230 may be securely attached to the second component 260 by an epoxy capable of withstanding the high temperatures of a gas turbine engine 20. The second component 260 may be composed of a ceramic material capable of withstanding the high temperatures of a gas turbine engine 20.

The second component 260 may have a first side 264 and a second side 266 parallel to the first side 264. The first side 264 shares a common wall 269 with the blind hole base 263. The second component 260 also comprises a mid-section 270 interposed between the first side 264 and the second side 266. In an embodiment, a second diameter D7 of the second side 266 may be larger than a first diameter D6 of the first side 264. The second side 266 may be affixed to the blade outer air seal 62 and/or the abradable coating 74. The second side 266 may be affixed to the blade outer air seal 62 and/or the abradable coating 74 by an epoxy in a non-limiting example. If the blade 55 strikes the second component 260 then a layer of the second component 260 will be removed from the first side 264. Thus, the first side 264 delaminates when impacted by a blade 55 of the gas turbine engine 20. Delaminate may be understood to mean the removal of material from the second component 260 in layers. In an embodiment, the first component 230 is configured to delaminate when impacted by a blade 55 of the gas turbine engine 20. The second component 260 will continue to delaminate in layers until the first component 230 is exposed to the blade 55 and then the first component 230 and the second component 260 will delaminate together. In an embodiment, the mid-section 270 of the second component 260 between the first side 264 and the second side 266 may have conical frustum shape, as seen in FIG. 5. Advantageously, since the mid-section 270 is within the flow path of the gas turbine engine 20, a conical frustum shape is aerodynamic and may provide reduce disturbance to airflow through the gas turbine engine 20. Also advantageously, a conical shape may minimize major material loss when struck by the blade 55. As may be appreciated by one of skill in the art, the second component 260 may include various shapes, sizes and reference dimensions not disclosed herein.

The second component 260 may also include an extrusion 268 projecting out from the second side 266. The extrusion 268 may provide additional support to the first component 230. The extrusion 268 may protrude into the blade outer air seal 62.

Figure 6:
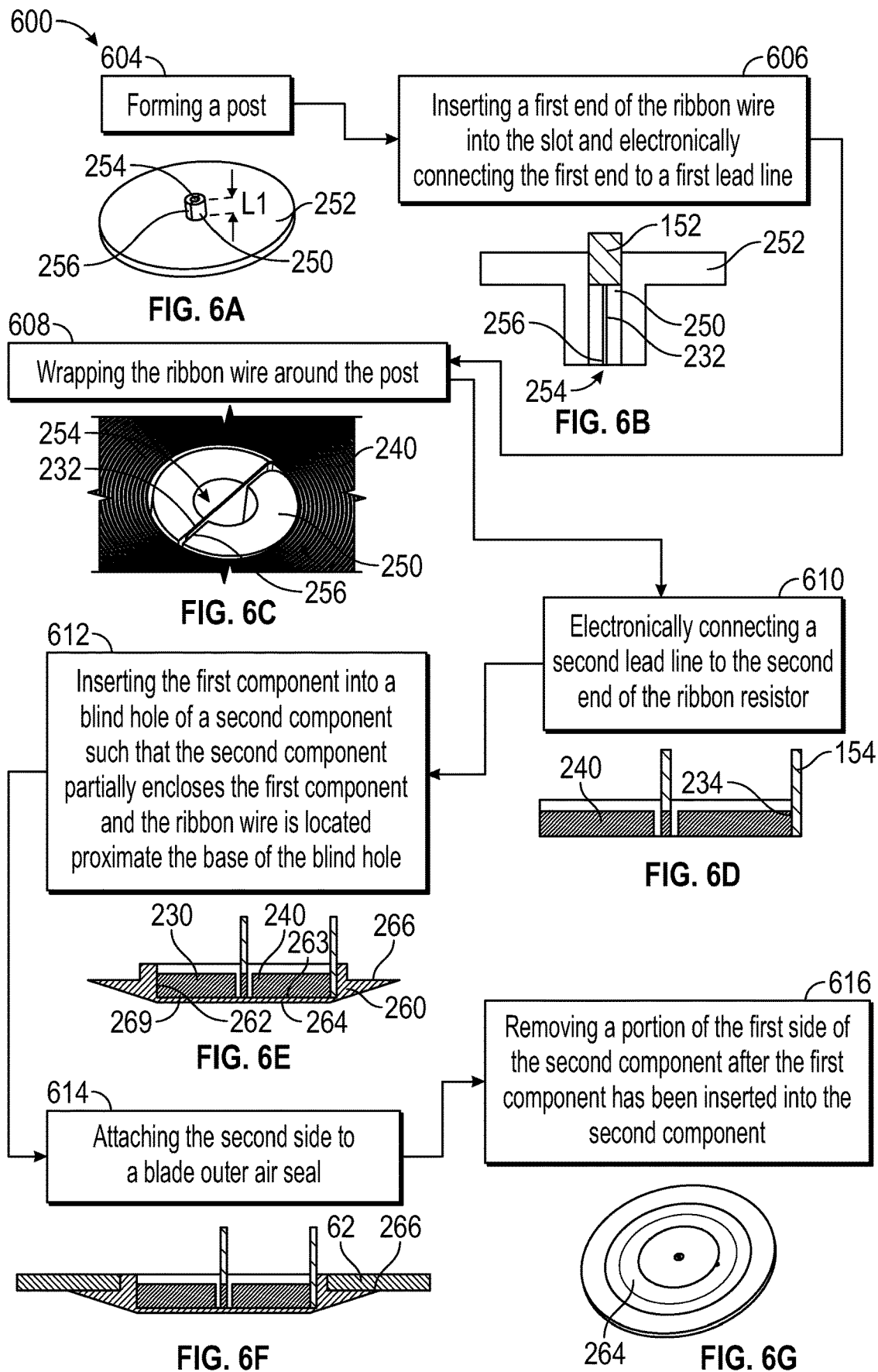
FIG. 6a-6g is a flow chart illustrating a method of manufacturing the wear indicator of FIG. 5, in accordance with an embodiment of the disclosure.

Referring now to FIGS. 6a-6g with continued reference to FIG. 5. FIGS. 6a-6g shows a flow chart illustrating a method 600 for manufacturing a wear indicator 200 in accordance with an embodiment of the present disclosure. Blocks 604 and 608 illustrate the fabrication/assembly of a first component 230 of the wear indicator 200. At block 604, a post 250 is formed. The post 250 may be operably connected to a base 252. The post 250 may also include an orifice 254 and a slot 256. The orifice 254 may run parallel along the length L1 of the post 250, as seen in FIG. 6a. The slot 256 may cut the post 250 in half along the length L1 of the post 250, as seen in FIG. 6a. At block 606, a first end 232 of the ribbon wire 240 is inserted into the slot 256 of the post 250 and a first lead line 152 is electrically connected to the first end 232 within the orifice 254, as seen in FIG. 6b. At block 608, the ribbon wire 240 is wrapped around the post 250. Once wrapped around the post 250, the ribbon wire 240 forms a coiled resistive element having a known resistance. At block 610 a second lead line 154 is electrically connected to the second end 234 of the ribbon wire 240.

At block 612, a second component 260 having a blind hole 262 with a blind hole base 263 is obtained. Also at block 612, the first component 230 is inserted into the blind hole 262 such that the second component 260 partially encloses the first component 230 and ribbon wire 240 is located proximate the base 263 of the blind hole 262. Block 612 may also include forming the second component 260. As mentioned above, a formed second component 260 may include a first side 264 that delaminates when impacted by a blade 55 of the gas turbine engine 20; and a second side 266 parallel to the first side 264. The first side 264 shares a common wall 269 with the blind hole base 263. Block 612 may also include attaching the first component 230 to the second component 260. The first component 230 may be attached to the second component 260 using an epoxy.

At block 614, the second side 266 is attached to a blade outer air seal 62. At block 616, a portion of the first side 264 of the second component 260 is removed after the first component 230 has been inserted into the second component 260. The portion may be removed by grinding the first side 264. Advantageously, a portion of the first side 264 may be grinded away in order to achieve a desired starting size for the wear indicator 200.

While the above description has described the flow process of FIGS. 6a-6g in a particular order, it should be appreciated that unless otherwise specifically required in the attached claims that the ordering of the steps may be varied.

Figure 7:
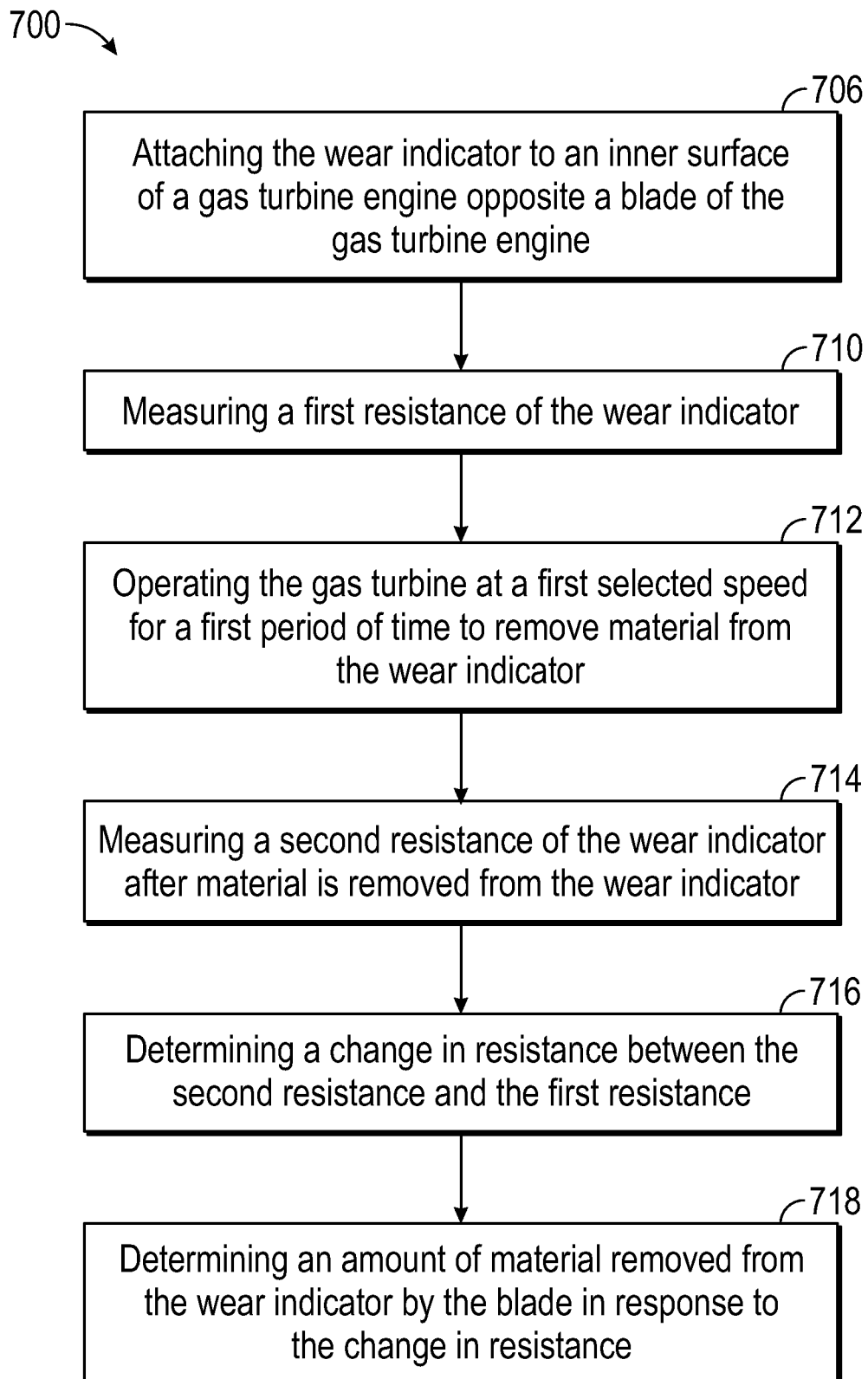
FIG. 7 is a flow chart illustrating a method of detecting blade clearance within a gas turbine engine, in accordance with an embodiment of the disclosure.

Referring now to FIG. 7 with continued reference to FIGS. 1-6. FIG. 7 is a flow chart illustrating a method 700 for detecting blade clearance in a gas turbine engine 20, in accordance with an embodiment. At block 706, the wear indicator 100, 200 is attached to an inner surface 72 of a gas turbine engine 20 opposite a blade 55 of the gas turbine engine 20. At block 710, a first resistance of the wear indicator 100, 200 is measured. At block 712, the gas turbine engine 20 is operated at a first selected speed for a first period of time to remove material from the wear indicator 100, 200. At block 714, a second resistance of the wear indicator 100, 200 is measured after material is removed from the wear indicator 100, 200. At block 716, a change in resistance between the second resistance and the first resistance is determined. At block 718, an amount of material removed from the wear indicator 100, 200 by the blade 55 is determined in response to the change in resistance. Method 600 may also include: determining a clearance between the blade 55 and the inner surface 72 in response to the amount of material removed from the wear indicator 100, 200.

While the above description has described the flow process of FIG. 7 in a particular order, it should be appreciated that unless otherwise specifically required in the attached claims that the ordering of the steps may be varied.

Technical effects of embodiments of the present disclosure include using a wear indicator to determine blade tip clearance through detecting a change in electrical resistance.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. In combination a wear indicator and a component of a gas turbine engine, wherein the wear indicator is secured to a surface of the component of the gas turbine engine, the wear indicator comprising:
a first component including:
a first plate;
a second plate opposite the first plate;
a plurality of wires extending from first plate to the second plate, wherein the first plate is electrically connected to the second plate through the plurality of wires; and
a non-conductive potting material configured to partially fill the first component and fill voids between the plurality of wires, the plurality of wires being electrically insulated from each other by the potting material.

2. The combination of claim 1, wherein the first component is configured to delaminate when impacted by a blade of the gas turbine engine.

3. The combination of claim 1, further comprising: a second component of the wear indicator having a blind hole partially enclosing the first component, wherein the wear indicator is secured to a surface of the component of the gas turbine engine through the second component.

4. The combination of claim 1, wherein the component is a blade outer air seal.

5. The combination of claim 1, further comprising a measurement device electrically connected to the first plate through a first lead line and electrically connected to the second plate through second lead line, wherein the measurement device is configured to determine the resistance of at least one of the first plate, the second plate, and the plurality of wires.

6. The combination of claim 3, wherein the second component further comprises:
a first side that delaminates when impacted by a blade of the gas turbine engine;
a second side parallel to the first side, the second side being secured to the component of the gas turbine engine; and
a mid-section interposed between the first side and the second side;
wherein the mid-section is conical frustum in shape.

7. The combination of claim 1, wherein the first component has a cylindrical shape.

8. The combination of claim 7, wherein the first plate and the second plate compose a substantial portion of a curved surface of the cylindrical shape, wherein the first plate and the second plate are separated by a gap in the curved surface.

9. The combination of claim 1, wherein the first plate further includes a plurality of first orifices and the second plate further includes a plurality of second orifices, and wherein each of the plurality of wires extends from a first orifice to a second orifice.

* * * * *